J. BARRÈRE.
LID LIFTER.
APPLICATION FILED JUNE 5, 1914.
1,133,912.
Patented Mar. 30, 1915.
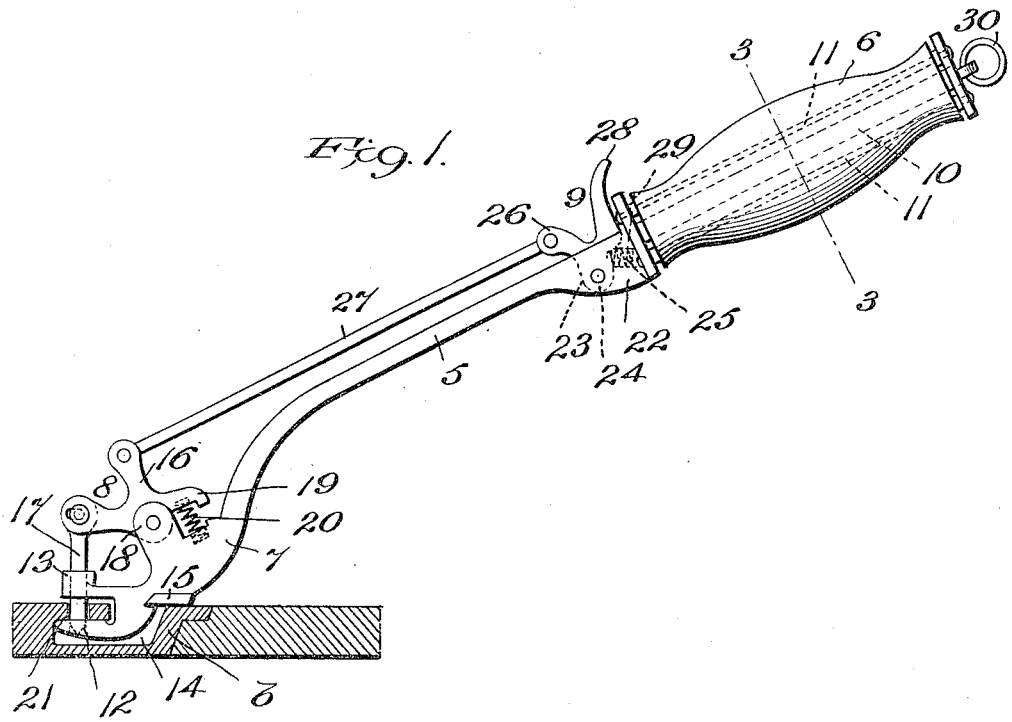
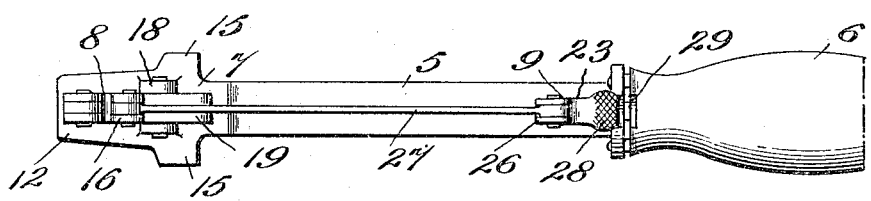
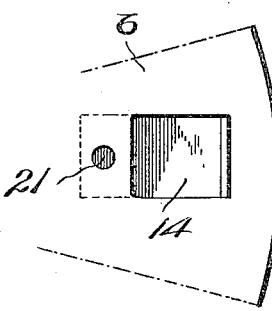
Inventor
Joseph Barrère,
By Victor J. Evans
Attorney
Witnesses
James Cronin
H. L. Laughlin
THE NORRIS PETERS CO., PHOTO-LITHO., WASHINGTON, D. C.

UNITED STATES PATENT OFFICE.

JOSEPH BARRÈRE, OF NEW YORK, N. Y.

LID-LIFTER.

1,133,912. Specification of Letters Patent. Patented Mar. 30, 1915.

Application filed June 5, 1914. Serial No. 843,252.

*To all whom it may concern:*

Be it known that I, JOSEPH BARRÈRE, a citizen of the United States, residing at New York, in the county of New York and State of New York, have invented new and useful Improvements in Lid-Lifters, of which the following is a specification.

The general object of this invention is to refine the construction of lifters for stove-lids and the like in point of providing a lifter whereby a lid may be removed from a stove in an effectual manner without the possibility of the lid becoming accidentally disengaged from the lifter as in the case of the ordinary lifter now in use. And to these ends the invention consists of a lifter having a toe portion adapted to be inserted in the socket of a stove-lid and a spring-pressed pin for securing the lid to the lifter and a finger-operating trigger for manipulating the pin.

Other objects will appear and be better understood from that embodiment of my invention of which the following is a specification, reference being had to the accompanying drawings forming part hereof, in which:—

Figure 1 is a side elevational view of my improved lifter in operative engagement with a stove-lid. Fig. 2 is a top plan view of the lifter *per se*. Fig. 3 is a cross-sectional view taken on the line 3—3 in Fig. 1, and Fig. 4 is a detail fragmentary plan view of a portion of a lid adapted for my lifter.

As shown in the drawings the lifter *a* comprises a shank 5, which is provided at one end with a handle 6 and at its other end with a lid gripping portion 7 in which is pivotally mounted a locking-member 8 and located adjacent to the handle is a means 9 for operating the locking-member 8.

The shank 5 may be made of any suitable material such as cast iron or the like and has one end narrowed for a portion of its length, and is rectangular in cross section as indicated by 10, and fitted upon this portion is a handle 6 which is secured in place on the shank by the longitudinal tie-rods 11 as shown. The opposite end of the shank is curved as shown in Fig. 1 and is provided with the lid-gripping portion 7 as before stated. This portion 7 has its end bifurcated which thus provides a toe-portion 12 and a bearing 13 which latter is engaged and bored as shown. It will be seen that by virtue of the bearing and toe-portion being in spaced relation with each other, the gripping portion 7 may be readily positioned on a lid, by inserting the toe-portion 12 in the socket 14 of the lid *b* as shown. The gripping-portion 7 is also provided with oppositely disposed lateral wings 15—15 which are formed integrally with the gripping-portion and operate to engage with the surface of the lid and assist in equilibrizing the lid on the lifter, when the lid is being removed from the stove.

The locking member 8 is composed of the bell-crank 16 and the pin 17 which is pivotally carried by the bell-crank at one end thereof. The bell-crank 16 is pivotally mounted in the bearings 18 integrally formed on the upper side of the gripping-portion 7, and has an offset finger 19 which is normally spaced from the portion 7 by a coil-spring 20, and by virtue of this spring, the pin 17, is normally held in a lowered position. The pin 17 is slidably fitted in the bearing 13, and by providing a suitable bore or opening in the lid, as indicated by 21, the pin may be directed therein by the action of the spring 18, when the gripping-portion is positioned on the lid, thus securing the lid in locked position on the lifter.

The trigger 9 may be formed of material similar to the general structure of the lifter and is substantially bell-crank in shape. It will be noted that adjacent to the handle 6, the shank 5 is appreciably enlarged as indicated by 22, and provided within the enlarged portion 22 is a recess or pocket 23, in which is pivotally secured the end 24 of the trigger; a coil spring 25 is also fitted within the pocket and is positioned between the end 24 of the trigger and one end of the pocket, thus inviting the trigger to remain normally in the position shown. The trigger has pivotally connected to one of its arms 26 a rod 27 which rod is also pivotally secured to the bell-crank 16 as shown. The other arm 28 of the trigger is knurled on its upper face and thus admits of being pressed down by the thumb or finger against the action of the spring 25 so as to manipulate the locking-member 8 at the lower end of the lifter. As shown the handle is recessed as indicated by 29 so as to allow the pull movement of the trigger when the latter is operated. A ring 30 is provided on the end of the handle whereby to provide a suitable means for suspending the lifter from a nail support when the lifter is not in use.

It will be noted that for the purpose of preventing the handle, which is preferably formed of wood or cork, from becoming heated when the lifter is in use the same is held substantially in spaced relation from direct contact with the metal forming the upper end of the lifter as shown in Figs. 1 and 3.

It is obvious that those skilled in the art may vary the details of construction and arrangements of parts without departing from the spirit of my invention and therefore I do not wish to be limited to any such features except as may be required by the claim.

What I claim as new is:—

A lid lifter comprising a shank having a toe portion and a bearing spaced therefrom and provided with outstanding shoulders the lower surfaces of which are in alinement with the space between the toe and the bearing, a pin slidably mounted in the bearing and engageable with the toe portion, and a spring pressed lever fulcrumed upon the shank and operatively connected with the pin.

In testimony whereof I affix my signature in presence of two witnesses.

JOSEPH BARRERE.

Witnesses:
JOHN A. DONEGLE,
GEO. A. BYRNE.

Copies of this patent may be obtained for five cents each, by addressing the "Commissioner of Patents, Washington, D. C."